United States Patent [19]

Murakami

[11] Patent Number: 5,442,717
[45] Date of Patent: Aug. 15, 1995

[54] SHARPNESS PROCESSING APPARATUS

[75] Inventor: Shigeo Murakami, Kyoto, Japan

[73] Assignee: Dainippon Screen Mfg. Co., Ltd., Kyoto, Japan

[21] Appl. No.: 39,659

[22] Filed: Mar. 30, 1993

[30] Foreign Application Priority Data

Apr. 21, 1992 [JP] Japan ............... 4-129541

[51] Int. Cl.⁶ ............... H04N 1/46; G03F 3/08
[52] U.S. Cl. ............... 382/162; 358/520; 358/518; 358/537; 358/518; 382/254
[58] Field of Search ............. 358/526, 519, 530, 520, 358/532, 538, 518, 504, 512, 537, 515; 382/54, 17

[56] References Cited

U.S. PATENT DOCUMENTS

| | | | |
|---|---|---|---|
| 4,649,423 | 3/1987 | Hoffrichter | 358/520 |
| 4,812,903 | 3/1989 | Wagensonner et al. | 358/520 |
| 5,060,060 | 10/1991 | Udagawa et al. | 358/520 |
| 5,134,667 | 7/1992 | Suzuki | 382/22 |
| 5,335,097 | 8/1994 | Murakami | 358/518 |

FOREIGN PATENT DOCUMENTS

| | | | |
|---|---|---|---|
| 0226959 | 7/1987 | European Pat. Off. | G06F 15/72 |
| 032289A2 | 7/1989 | European Pat. Off. | H04N 1/46 |
| 0322879 | 7/1989 | European Pat. Off. | H04N 1/46 |
| 0327107 | 8/1989 | European Pat. Off. | H04N 1/46 |
| 0327107A2 | 8/1989 | European Pat. Off. | H04N 1/46 |
| 0457427A2 | 11/1991 | European Pat. Off. | H04N 1/46 |
| 0457427 | 11/1991 | European Pat. Off. | H04N 1/46 |
| 2117902A | 10/1983 | United Kingdom | H04N 1/46 |

*Primary Examiner*—Leo H. Boudreau
*Assistant Examiner*—Matthew C. Bella
*Attorney, Agent, or Firm*—Lowe, Price, LeBlanc & Becker

[57] ABSTRACT

A sharpness processing apparatus for enhancing or suppressing tone variations in an original image. A lookup table for converting RGB signals into HSL values which are the three attributes of perceived colors is used to obtain HLS values of pixels in the original image stored in a frame memory. The HSL values of the pixels are successively compared with HSL values indicating an effective range of sharpness processing determined with reference to a designated reference color, to determine pixels to be subjected to the processing. The processing is effected by applying a parameter to the RGB signals of the pixels subjected to the processing. In this way, the apparatus facilitates designation of a region of sharpness processing. Besides, the value of the parameter is variable with differences between the HSL values of the pixels corresponding to the reference color and the HSL values of the pixels determined to be subjected to the processing, whereby the sharpness processing is effected without impairing smoothness of the original image.

17 Claims, 5 Drawing Sheets

SHARPNESS PROCESSING APPARATUS

BACKGROUND OF THE INVENTION

1. Field of the Invention

This invention relates to sharpness processing apparatus used, for example, in a video plate-making process for enhancing or suppressing tone variations in outline portions of an original image.

2. Description of the Related Art

The principle of sharpness processing will be described with reference to FIG. 1.

Assume that a particular region of an original image has an image signal S (i.e. an original image S) as shown in FIG. 1 (A). Key pixels in the particular region are successively selected, and an average signal is obtained from color component signals, for example, of 5×5 pixels surrounding each key pixel. This corresponds to an unsharp signal U as shown in FIG. 1 (B).

Next, the unsharp signal U is subtracted from the original signal S to obtain an unsharp mask signal (S-U) as shown in FIG. 1 (C). The unsharp mask signal (S-U) is added to the original signal S to obtain a signal enhancing outline portions as shown in FIG. 1 (D). At this time, the unsharp mask signal (S-U) is multiplied by a parameter k to adjust a degree of processing. The original signal S consists of three color component signals (RGB signals). Consequently, the sharpness processing is expressed as follows:

$S_R + k (S-U)$
$S_G + k (S-U)$
$S_B + k (S-U)$

A signal with enhanced sharpness is obtained if parameter k is larger than zero. However, if $-1 < k < 0$, the signal will be something between the original signal S and unsharp signal U as seen from the above expressions. This is a signal having reduced sharpness opposite to enhancement; a signal having undergone what is known as smoothing processing.

When such sharpness enhancement processing (or suppression processing: these are collectively called sharpness processing) is effected only for a particularly region in an original image, a pointing device such as a mouse is operated to designate the region on a monitor screen displaying the original image, and the above processing is carried out only for the pixels within this region.

However, a very difficult and irksome operation is required for designating such a particular region.

In the first place, where sharpness processing is desired only for a particular graphic figure, the more complicated the image is, the longer time is spent in designating the region. Where sharpness processing is desired only for graphic figures of a particularly color in the original image, the graphic figures having its color components must be designated individually. This involves a great amount of work.

When a particular region is designated in an original image having gradually changing image signals throughout, the image tends to be converted into an unnatural image with boundaries of the region abruptly becoming sharp or unsharp.

SUMMARY OF THE INVENTION

Having regard to the above state of the art, a primary object of this invention is to provide a sharpness processing apparatus which facilitates designation of a particular region or regions to be subjected to sharpness processing.

Another object of the invention is to provide a sharpness processing apparatus capable of effecting sharpness processing for a particular region of an original image having gradually changing image signals, without impairing the smoothness thereof.

The above objects are fulfilled, according to the present invention, by a sharpness processing apparatus for enhancing or suppressing tone variations in an original image, comprising:

original image data storage means for storing digitalized signals of R (red), G (green) and B (blue) of pixels in the original image;

an image data conversion table for converting the RGB signals into three attribute values (i.e. hue H, saturation S and lightness L: HSL values) of perceived colors;

processing condition designating means for designating a reference color to act as a central object for sharpness processing, and for designating a parameter to indicate a degree of the sharpness processing;

effective range determining means for determining, from the HSL values, an effective range of the sharpness processing with reference to the reference color;

object pixel determining means for determining pixels subjected to the sharpness processing by comparing the HSL values obtained by applying the RGB signals of pixels in the original image stored in the original image data storage means to the image data conversion table, and the HSL values determined by the effective range determining means and indicative of the effective range of sharpness processing; and sharpness processing means for effecting the sharpness processing by applying the parameter designated by the processing condition designating means to the RGB signals of pixels determined by the object pixel determining means to be objects of the sharpness processing.

The apparatus according to the present invention has a table for converting the RGB signals of the original image into HSL values which are the three attributes of perceived colors. Thus, an effective range of sharpness processing may be determined with the HSL values. When, for example, sharpness processing is desired only for a complex graphic figure, a particular color component of the graphic figure may be designated to indicate an effective range since an effective range of processing may be determined with values in a color space. A similarly simple operation is adequate also when only a plurality of graphic figures of the same color are subjected to sharpness processing.

The object pixel determining means determines pixels subjected to the sharpness processing, by comparing the HSL values indicating an effective range of sharpness processing determined and the HSL values of pixels in the original image. The sharpness processing means effects the sharpness processing by applying the parameter designated to the RGB signals of pixels determined to be subjected to the sharpness processing.

That is, the RGB signals are converted into HSL values in order only to determine whether a key pixel is in an effective range of sharpness processing. The sharpness processing is carried out for the RGB signals of the pixels determined to be within the effective range. Consequently, the apparatus does not require a table for changing the HSL values converted as above back to RGB signals. This effectively avoids an increased cost of the apparatus due to an enlarged capacity of the storage means. For the same reason, a high degree of precision is not required for the conversion from RGB signals to HSL values.

It is conceivable to designate an effective range with values of RGB signals. In this case, however, colors must always be considered with reference to an additive color mixture, and such designation can be made only by a skilled person capable of grasping a correlation between values designated and a range of color envisaged. By contrast, the designation with the HSL values which are the three attributes of colors perceived by humans enables a simple operation in that colors may be grasped by intuition.

The HSL values showing an effective range of sharpness processing may be designated with numeric values (HSL values), with HSL values obtained by applying to the image data conversion table the RGB signals of pixels showing the effective range and designated in the original image displayed on display means, or with default values of the HSL values showing an effective range.

The above apparatus may further comprise parameter amending means for computing differences between the HSL values of pixels corresponding to the reference color and the HSL values of pixels determined by the object pixel determining means to be subjected to the sharpness processing, and amending the parameter for the sharpness processing such that the larger the differences are, the smaller the parameter is made. Then, a particular region of the original image having smoothly varying image signals may undergo sharpness processing without losing the smoothness.

Assume that the HSL values of the reference color acting as a central object of the sharpness processing are (HSL), and the HSL values of the pixels determined by the object pixel determining means to be the objects of the sharpness processing are (hsl). Since (hsl) are values found within the effective range based on (HSL), (hsl) are present between (HSL) and critical values of the effective range.

Thus, the differences between (HSL) and (hsl) are minimum when (HSL)=(hsl), and become the larger the closer (hsl) are to the critical values of the effective range, i.e. to a boundary between object pixels for the sharpness processing and non-object pixels in the color space.

The sharpness processing is carried out with the parameter amended such that the larger the above differences are, the smaller the parameter becomes. The intensity of the sharpness processing using this parameter is minimum at the boundary between object pixels and non-object pixels, and becomes the greater the closer the object pixels are to the pixels corresponding to the reference color. Consequently, the sharpness processing produces smooth tone variations.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

DETAILED DESCRIPTION OF THE PREFERRED EMBODIMENT

A preferred embodiment of the present invention will be described in detail hereinafter with reference to the drawings.

Figure 1:
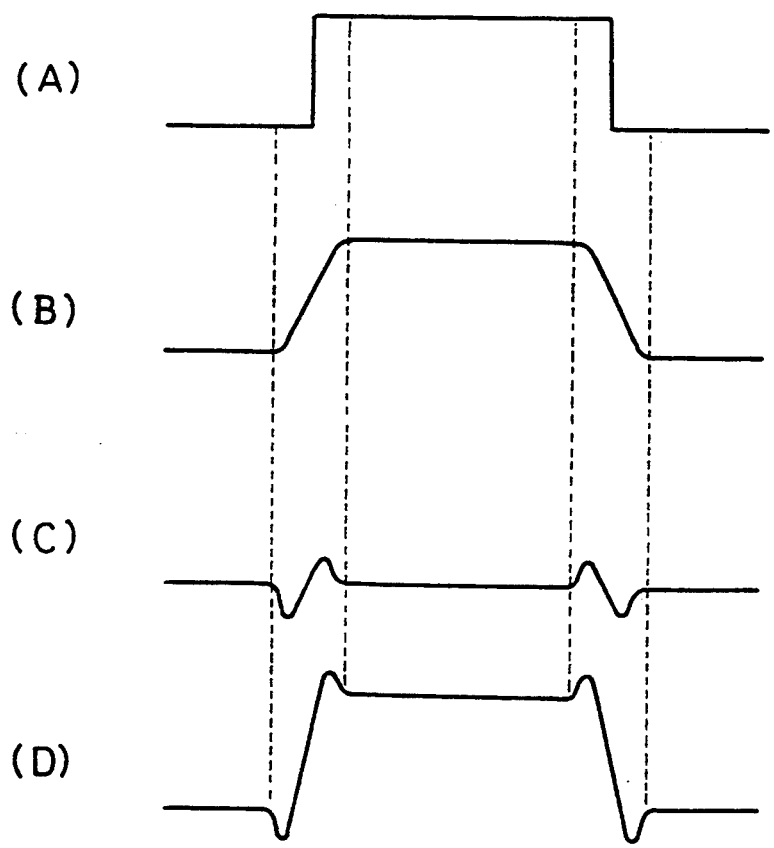
FIG. 1 is an explanatory view of the principle of sharpness processing in the prior art.
Figure 2:
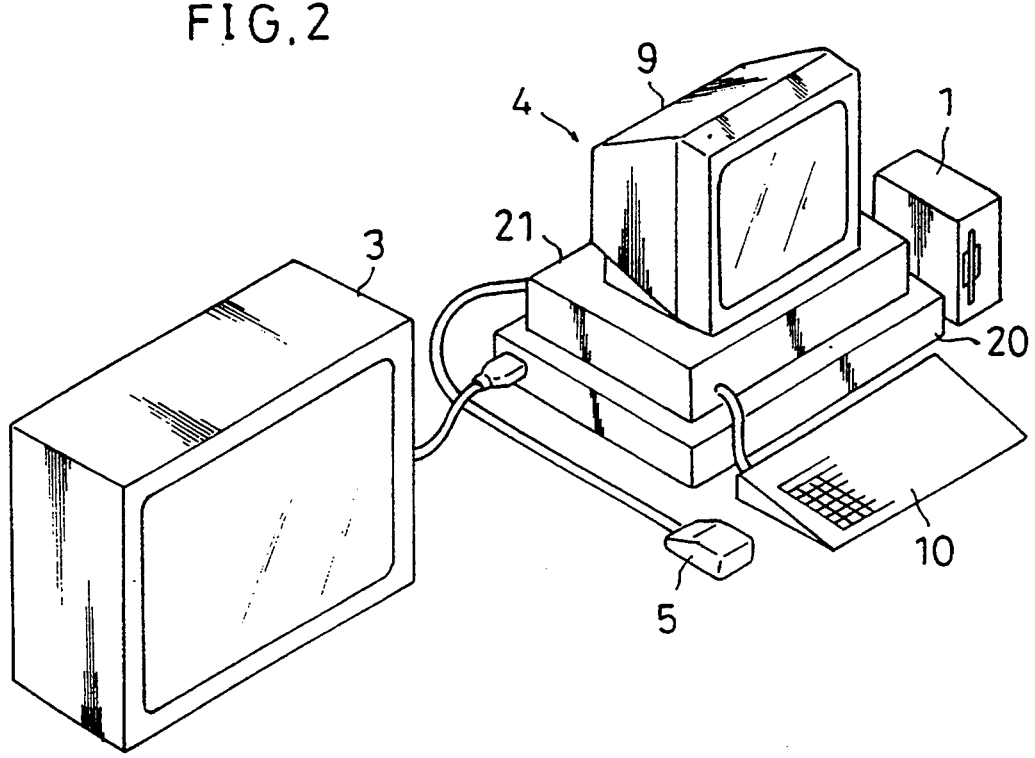
FIG. 2 is a perspective view showing an outward appearance of a sharpness processing apparatus embodying the present invention.

FIG. 2 is a perspective view showing an outward appearance of a sharpness processing apparatus.

The apparatus includes, as main components thereof, an image monitor 3 for displaying an image subjected to sharpness processing and an image resulting from the sharpness processing, a data input device 4, a drive unit 1 for driving a magneto-optical disk storing image data (i.e. a magneto-optical disk driver 1), and a frame memory unit 20 having frame memories for storing image data before and after the processing, respectively.

The data input device 4 includes a control monitor 9, a keyboard 10 and a mouse 5 for the operator (user of this apparatus) to input data, and a computer 21 whose chief function is the sharpness processing.

Figure 3:
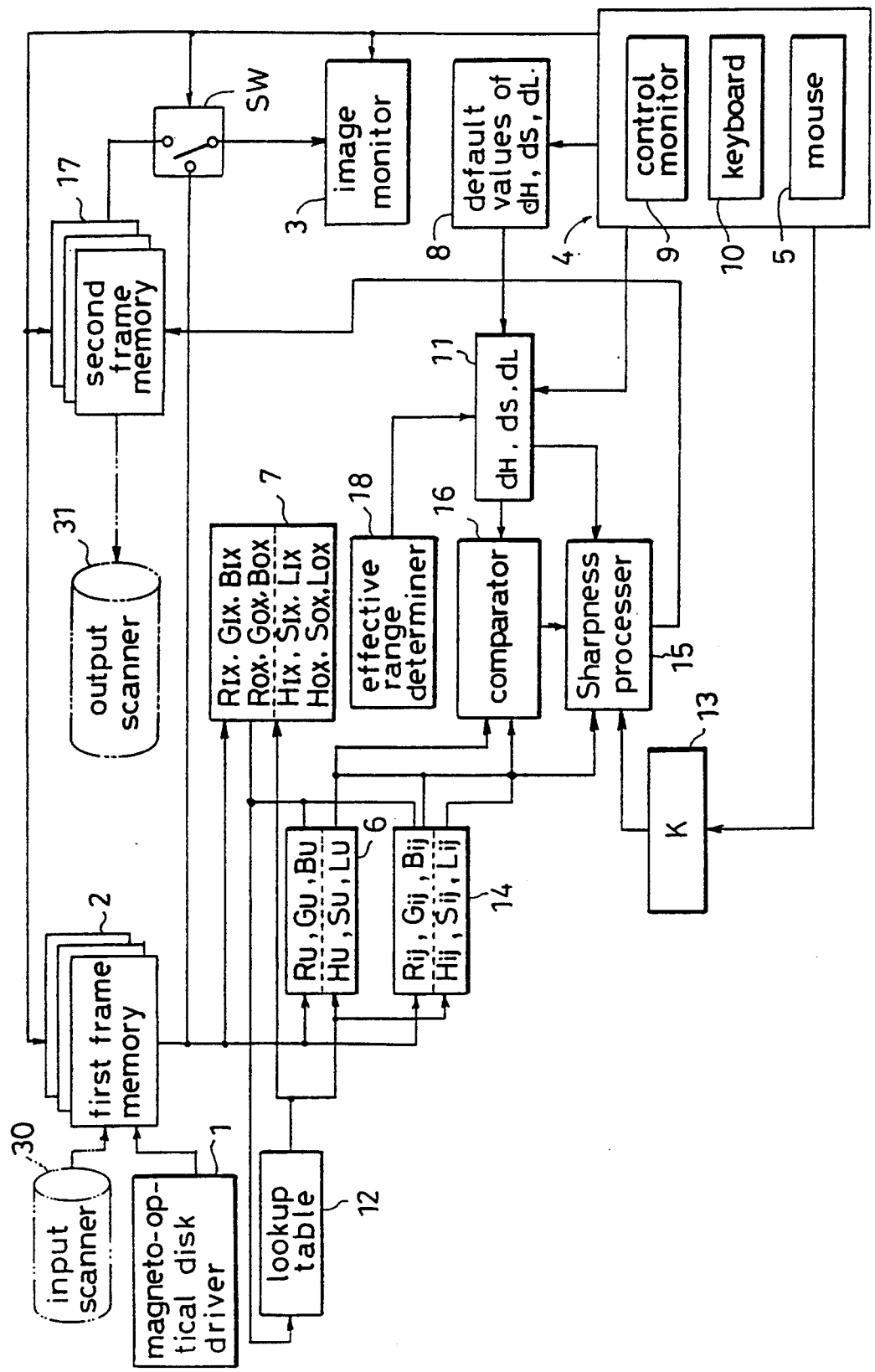
FIG. 3 is a block diagram showing an interior arrangement of the sharpness processing apparatus.

FIG. 3 is a block diagram of a system of this apparatus. The construction and operation of this apparatus will be described with reference to this block diagram, and in combination with controls made by the operator.

It is to be noted that FIG. 3 shows the part of functions of the computer 21 relating to the sharpness processing independently in the block diagram. The functions to carry out other types of processing, such as processing to output and display data on the control monitor 9, are assigned to the data input device 4.

The magneto-optical disk driver 1 acts to take digitalized image signals of an image to be processed (hereinafter called an original image) into this apparatus. Although it is assumed that original image signals are stored on a magneto-optical disk, these signals may be stored on a magnetic tape or a hard disk. In the latter case, the magneto-optical disk driver 1 is replaced with a drive unit for accessing the alternative storage medium. Further, the device for taking digitalized image signals of an original image into this apparatus may be an input scanner 30.

The first frame memory 2 has a capacity to store, in each frame, original image signals, i.e. color component signals of R (red), G (green) and B (blue), of one original image read through the magnet-optical disk driver 1.

The original image signals in the first frame memory 2 are outputted through an internal switch SW to the image monitor 3 to display the image thereon.

Figure 4:
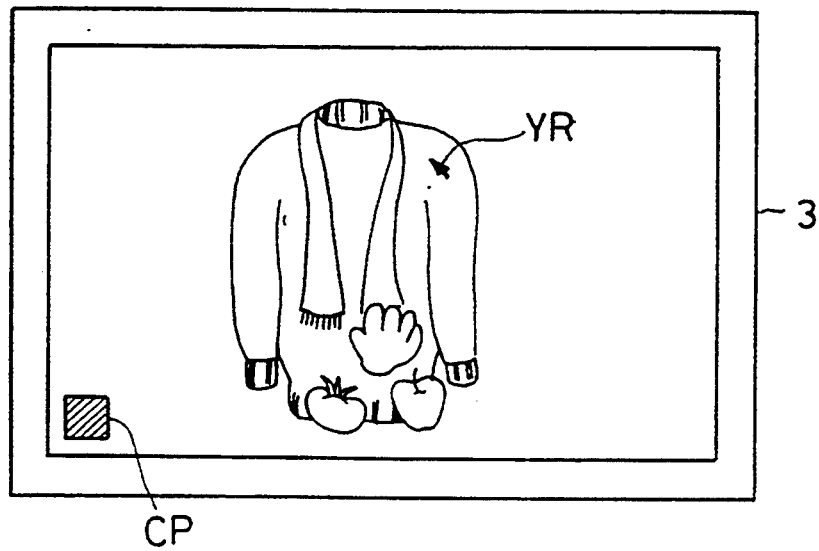
FIG. 4 is a view showing a way in which a mouse is used to designate a reference color in an original image displayed on an image monitor.

The operator controls a pointing device such as the mouse 5 of the data input device 4 while looking at the screen of the image monitor 3, to move an arrow YR on the screen to a position of a key color (reference color) in a color distribution region for which the operator desires to effect sharpness processing, as shown in FIG. 4. The operator then clicks a button on the mouse 5 to designate the region for sharpness processing by means of the color. When the reference color is designated, the data input device 4 outputs coordinate data of the point designated on the screen of the image monitor 3 as an address for reading by the first frame memory 2.

It is assumed here that the color component signals of R, G and B of the color read are Ru, Gu and Bu signals.

Figure 5A:
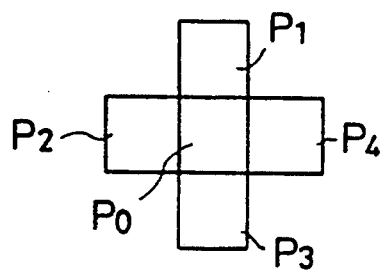
FIGS. 5A and 5B are views each showing a designated pixel and surrounding pixels.
Figure 5B:
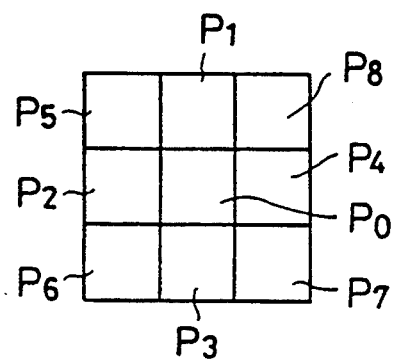

Although the Ru, Gu and Bu signals are the RGB signals of the point (pixel) designated with the mouse 5, the color of the point designated by the operator, i.e. the reference color as seen in the eyes of the operator, strictly speaking, does not consist in the color of the designated point alone but is influenced by colors surrounding the designated point. Thus, as shown in FIGS. 5A and 5B, the Ru, Gu and Bu signals may be based on average values of RGB signals of four adjacent pixels P1–P4 (FIG. 5A) or eight pixels P1–P8 (FIG. 5B) around the point P0 designated with the mouse 5.

Figure 6A:
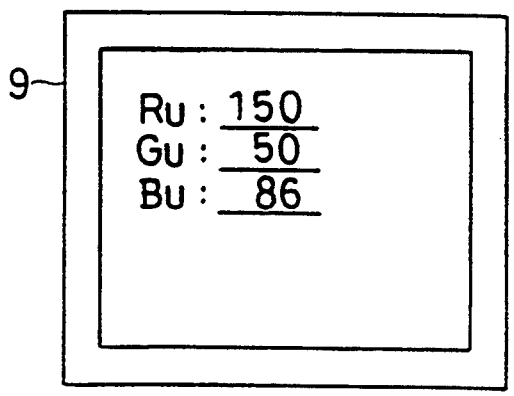
FIGS. 6A and 6B are views each showing an example of input screens for inputting numeric values of RGB signals to designate a reference color.
Figure 6B:
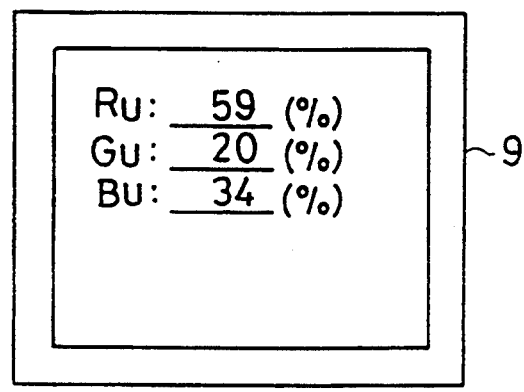

The Ru, Gu and Bu signals may be determined, for example, by inputting values of RGB signals directly through the keyboard 10 while looking at an input screen displayed on the control monitor 9, instead of operating the mouse 5 to designate a pixel in the original image displayed on the image monitor 3. In this case, if the RGB signals stored in the first frame memory 2 are 8-bit digital signals, the Ru, Gu and Bu signals may be designated with numeric values "0 to 255" to which the digital signals are decimalized, as shown in FIG. 6A. Alternatively, the Ru, Gu and Bu signals may be designated with values in percentage "0 to 100(%)" corresponding to the values "0 to 255" as shown in FIG. 6B.

The reference color designated with pixels in the original image or with numeric values as above may be displayed in a color patch superposed on the original image, in a predetermined region (e.g. a region in a lower left corner) on the screen of the image monitor 3 as indicated by reference CP in FIG. 4.

The color patch refers to a predetermined region on the image monitor 3 filled with a reference color designated, to enable the operator to observe the designated color independently of the original image.

Where, as noted above, the Ru, Gu and Bu signals are designated with numeric values inputted through the keyboard 10, a designated reference color (color patch) is displayed on the image monitor 3 in real time. This enables the operator to grasp instantly a correlation between the numeric values of the Ru, Gu and Bu signals designated and a reference color as envisaged by the operator. If the color patch differs from the reference color envisaged, the operator may vary the numeric vales of Ru, Gu and Bu signals to designate the reference color easily and accurately.

Figure 7:
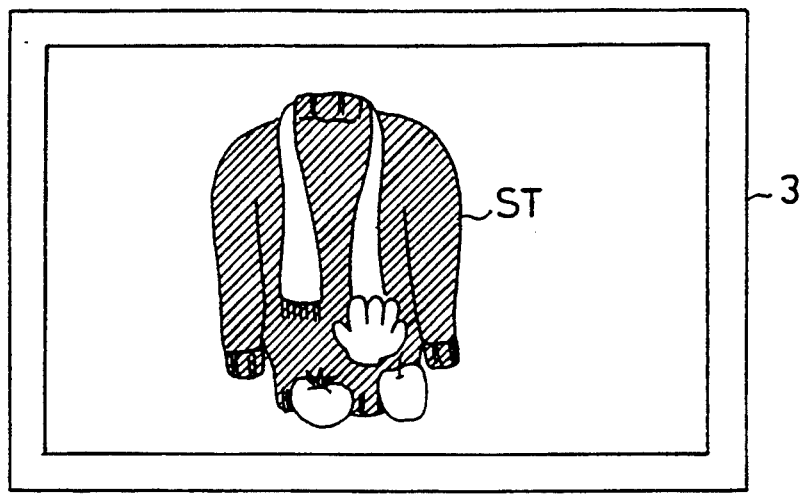
FIG. 7 is a view showing a distribution in an original image of RGB signals of the reference color.

As shown in FIG. 7, all the pixels in the original image corresponding to the Ru, Gu and Bu signals of the reference color may be highlighted by a special color or by flashing. This allows the operator readily to grasp a distribution of the reference color in the original image, for convenience in confirming a region subjected to sharpness processing on the screen. In FIG. 7, a sweater ST shown in hatching is displayed in the special color or flashed.

The Ru, Gu and Bu signals are stored in a first pixel value memory 6.

This memory and other memories described hereinafter are present as part of a storage region in an internal memory (main storage) of the computer 21. The computing units described hereinafter correspond to a CPU (central processing unit) for executing a program based on a processing algorithm.

Subsequently, the operator designates an effective range of sharpness processing, and sets a parameter for use in the processing.

Figure 8:
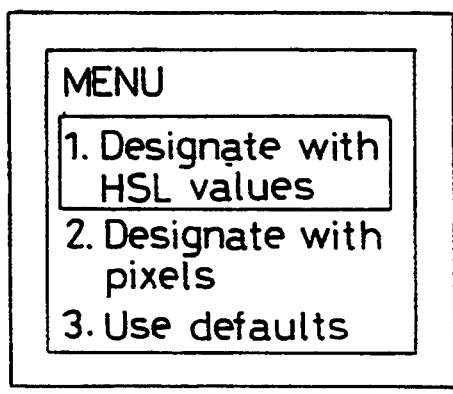
FIG. 8 is a view showing an example of menus for selecting a method of designating an effective range of sharpness processing.

In this apparatus, an effective range is determined by using HSL values or by designating a pixel or pixels in the original image, or default values may be used instead of designating an effective range. The operator selects the effective range designation with the HSL values, or with a pixel or pixels in the original image, or use of the default values, on a menu screen displayed on the control monitor 6 as shown in FIG. 8, through the keyboard 10 or otherwise. The selection may be made by moving a frame to a choice item by operating cursor keys or the like on the keyboard 10 and pressing the return key or the like.

Figure 9:
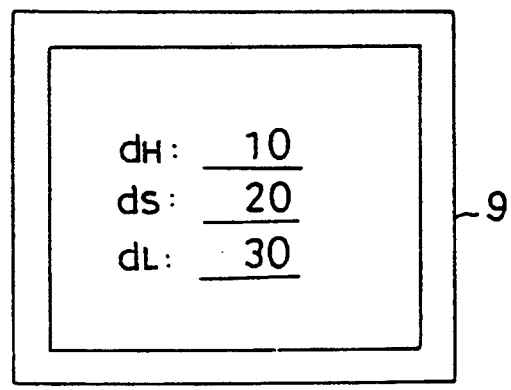
FIG. 9 is a view showing an example of input screens for designating an effective range of sharpness processing with HSL values.

When the HSL values are used for designation, values of dH, dS and dL as shown in FIG. 9 are inputted through the keyboard 10 and stored in an effective range memory 11. These values are expressed by Hu±dH, Su±dS and Lu±dL, where Hu is hue, Su is saturation and Lu is lightness corresponding to the Ru, Gu and Bu signals of the reference color.

An effective range is designated with HSL values because one must be conscious of an additive color mixture whenever handling the colors in a color mixing system such as of R, G and B, and it is difficult to designate a color by intuition. In this embodiment, an effective range of a color to be processed is designated with values in HSL color space having color differences suited to differences of perception by humans.

When the designation is made with a pixel or pixels in the original image, the mouse 5 is operated to designate a pixel or pixels in the original image displayed on the image monitor 3 as when designating a reference color (see FIG. 4).

Figure 10:
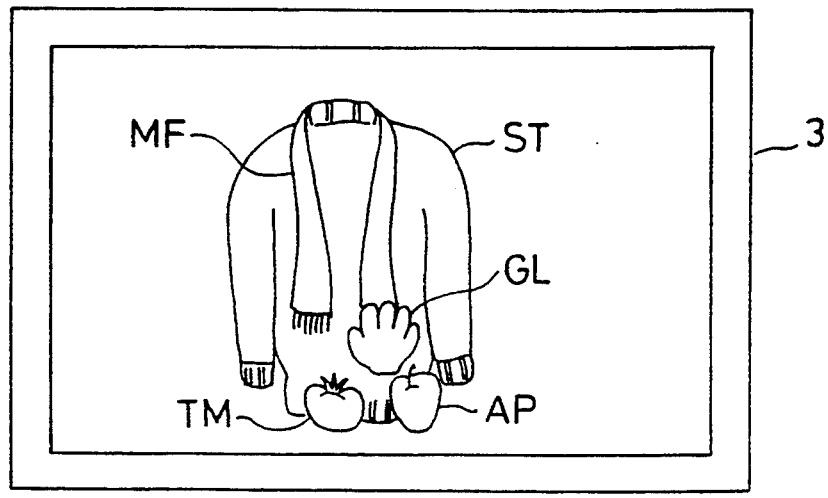
FIG. 10 is an explanatory view showing a method of designating an effective range of sharpness processing with pixels in the original image.

This designation mode has a number of variations, which will be described with reference to FIG. 10. It is assumed, for example, that the color (Ru, Gu, Bu) of a certain part of the red sweater in the original image is designated to be the reference color.

(1) Designate one example of pixels for which sharpness processing is desired.

Where, for example, sharpness processing is desired for the red sweater ST and the red of an apple AP adjacent the sweater ST, a pixel of the apple AP in the original image may be designated as an example of pixels subjected to the sharpness processing.

(2) Designate one example of pixels for which sharpness processing is not desired.

Where, for example, sharpness processing is not desired for the red of a tomato TM adjacent the red sweater ST, a pixel of the tomato TM in the original image may be designated as an example of pixels to be excluded from the sharpness processing.

(3) Designate one example of pixels for which sharpness processing is desired and one example of pixels for which the sharpness processing is not desired.

Where, for example, sharpness processing is desired for the red sweater ST and the red of the apple AP adjacent the sweater ST but not for the red of the tomato TM adjacent the sweater ST, a pixel of the apple AP in the original image may be designated as an example of pixels subjected to the sharpness processing, and a pixel of the tomato TM in the original image may be designated as an example of pixels to be excluded from the sharpness processing.

(4) Designate a plurality of examples of pixels for which sharpness processing is desired.

Where, for example, sharpness processing is desired for the red sweater ST, the red of the apple AP and the red of a red muffler MF adjacent the sweater ST, a pixel of the apple AP and a pixel of the muffler MF in the original image may be designated as examples of pixels subjected to the sharpness processing.

(5) Designate a plurality of examples of pixels for which sharpness processing is not desired.

Where, for example, sharpness processing is not desired for the red of the tomato TM or the red of a red glove GL adjacent the red sweater ST, a pixel of the tomato TM and a pixel of the glove GL in the original image may be designated as examples of pixels to be excluded from the sharpness processing.

(6) Designate a plurality of examples of pixels for which sharpness processing is desired, and a plurality of examples of pixels for which the sharpness processing is not desired.

Where, for example, sharpness processing is desired for the red sweater ST, the red of the apple AP and the red of the muffler MF adjacent the sweater ST, but not the red of the tomato TM or the red of the red glove GL adjacent the red sweater ST, a pixel of the apple AP and a pixel of the muffler MF in the original image may be designated as examples of pixels subjected to the sharpness processing, and a pixel of the tomato TM and a pixel of the glove GL in the original image as examples of pixels to be excluded from the sharpness processing.

When the designation is made on the screen of the image monitor 3, the RGB signals stored at the addresses in the first frame memory 2 corresponding to the designated points (examples of pixels subjected to sharpness processing and/or those excluded from the sharpness processing) are read as $R_1x$, $G_1x$ and $B_1x$ signals (of the examples of pixels subjected to the processing) and/or $R_0x$, $G_0x$ and $B_0x$ signals (of the examples of pixels excluded from the processing) (where x is the number of pixels designated), and stored in an effective range pixel value memory 7. Since the pixels may be designated in various ways as noted above, the RGB signals are stored in the effective range pixel value memory 7 according to a selected designating mode.

Based on the $R_1x$, $G_1x$ and $B_1x$ signals and/or $R_0x$, $G_0x$ and $B_0x$ signals stored in the effective range pixel value memory 7, an effective range dH, dS, dL is determined by effective range determination processing described hereinafter, and stored in the effective range memory 11.

Where an effective range is not designated, default values of an effective range stored in a default memory 8 are applied as they are to the effective range memory 11. These default values are stored in the form of dH, dS and dL which can be updated.

The parameter determines a degree of sharpness processing as described with reference to the prior art, and is affixed with reference k herein. For sharpness enhancement processing, the operator sets a value of parameter $k>0$ through the keyboard 10. For sharpness suppression processing, the operator sets a value of parameter $-1<k<0$. The parameter k inputted is stored in a parameter memory 13.

This apparatus determines, prior to execution of sharpness processing, whether the color components of pixels in the original image stored in the first frame memory 2 are in the effective range of sharpness processing or not. This determination is based on the information thus far inputted or extracted, i.e. "the RGB signals of the pixel (reference color) of the point designated with reference to the color of the region to be processed (Ru, Gu and Bu signals)", "the HSL values showing an effective range of sharpness processing, or the pixels showing an effective range of sharpness processing, or the default values of the effective range where no effective range is designated", and "the value of parameter k".

In order to determine whether the color components of pixels in the original image are in the effective range of sharpness processing or not, the values of R, G and B are converted into values of hue H, saturation S and lightness L. For this purpose, a lookup table 12 is prepared and stored in the following sequence.

The values of R, G and B, which do not correspond directly to the values of hue H, saturation S and lightness L, are converted into values in Lab color space (This color space is recommended by the Commission Internationale de l'Eclairage (CIE) as an equivalent perceived color space). The values in Lab color space are converted into values in HSL color space.

For converting the values of R, G and B for Lab color space, tristimulus values Ximax, Yimax and Zimax (i=R, G, B) when maximum values Rmax, Gmax and Bmax of R, G and B are applied to the image monitor 3 are first measured with a spectral radiometer.

Next, the gamma of the image monitor 3 (a constant showing a relationship between input signal and luminous output of a color monitor: hereinafter expressed by sign "t" for expediency) is used to derive, from the following equations, tristimulus values X, Y and Z when given values r, g and b of RGB are inputted:

$$X = \Sigma(j/i\text{max})^t \cdot X i\text{max}$$
$$:(i = R, G, B, j = r, g, b)$$
$$Y = \Sigma(j/i\text{max})^t \cdot Y i\text{max}$$
$$:(i = R, G, B, j = r, g, b)$$
$$Z = \Sigma(j/i\text{max})^t \cdot Z i\text{max}$$
$$:(i = R, G, B, j = r, g, b)$$

In the above equations, as i=R, G or B, so j=r, g or b.

The tristimulus values X, Y and Z are used to convert the values of R, G and B into values in Lab color space, as by the following equations. These converting equations are stipulated by the CIE.

$L = 116 \cdot (Y/Yn)^{\frac{1}{3}} - 16$
$a = 500 \cdot [(X/Xn)^{\frac{1}{3}} - (Y/Yn)^{\frac{1}{3}}]$
$b = 200 \cdot [(Y/Yn)^{\frac{1}{3}} - (Z/Zn)^{\frac{1}{3}}]$ where $Yn = \Sigma Y i\text{max}$ (i=R, G, B), $Xn = \Sigma X i\text{max}$ (i=R, G, B), and $Zn = \Sigma Z i\text{max}$ (i=R, G, B).

Figure 11:
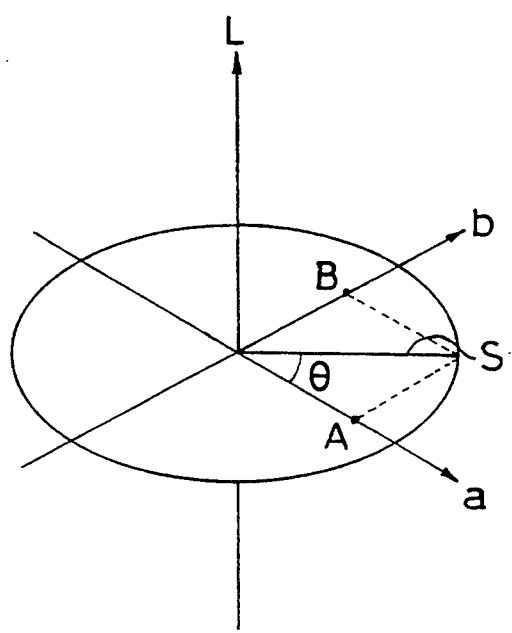
FIG. 11 is a view showing a relationship between an HSL color space and Lab color space having hue, saturation and lightness values in a three-dimensional coordinate system.

FIG. 11 shows a relationship between Lab color space and HSL color space.

In FIG. 11, the L-axis of Lab color space corresponds directly to lightness L of HSL color space, a radius vector on two-dimensional coordinates of the a-axis and b-axis corresponds to saturation S, and an angle $\theta$ between the a-axis and radius vector corresponds to hue H.

Thus, the L value obtained above is regarded as the value of lightness in HSL color space, and saturation S and hue H are derived from the following equations:

$$S^2 = A^2 + B^2$$
$$H = \tan^{-1}(B/A)$$

However, when $A<0$, 180 degrees are added to a result of computation for hue H, and when $A>0$ and $B<0$, 360 degrees are added thereto. This is done in order to avoid results of computation showing negative values.

The values of H, S and L derived from the above operational expressions and corresponding to the values of R, G and B are stored in the lookup table 12 shown in FIG. 3.

However, if the number of bits in the digitalized RGB signals is n, the number of combinations of the values of R, G and B is $n^3$. The values of H, S and L corresponding to all of these would make an enormous amount of data. Thus, for example, several lower bits may be deleted from the n-bits to make m-bits (n>m), and the values of H, S and L (which are in n-bits since data need not be deleted therefrom) corresponding to the RGB signals in m-bits may be stored in the lookup table 12.

As noted hereinbefore, the values of RGB signals are converted into the values of HSL color space in order to determine whether the color components of pixels in the original image are within the designated effective range of sharpness processing or not. Since the values of HSL color space obtained by the conversion are not used in the sharpness processing, no problem of low precision arises from the reduction in the number of bits of the RGB signals.

Then, only the m-bits left after deleting the several lower bits from the Ru, Gu and Bu signals (in n-bits) of the color to be processed, stored in the first pixel value memory 6 are outputted to the lookup table 12 to obtain the H, S and L values in n-bits. These are expressed as Hu, Su and Lu. The values Hu, Su and Lu are stored in a different storage region of the first pixel value memory 6.

An effective range determiner 18 determines an effective range designated with a pixel or pixels. Prior to the determination of the effective range by the effective range determiner 18, only the m-bits left after deleting the several lower bits from $R_1x$, $G_1x$ and $B_1x$ signals and/or $R_0x$, $G_0x$, $B_0x$ signals (stored in the effective range pixel value memory 7) extracted from the pixel or pixels designated, as in the case of the first pixel value memory 6, are outputted to the lookup table 12 to obtain $H_1x$, $S_1x$ and $L_1x$ signals and/or $H_0x$, $S_0x$ and $L_0x$ signals in n-bits. These signals are stored in a different storage region of the effective range pixel value memory 7.

The effective range is determined by various methods depending on the way (1)–(6) in which the pixel or pixels are designated as described hereinbefore. Each method will be described below.

(1) Where one pixel is designated as an example of pixels for sharpness processing, the $R_1x$, $G_1x$ and $B_1x$ signals and $H_1x$, $S_1x$ and $L_1x$ signals (where x=1) are stored in the effective range pixel value memory 7. Absolute differences between the $H_1x$, $S_1x$ and $L_1x$ signals and Hu, Su and Lu which are the HSL values of the reference color, multiplied by $\alpha$ ($\alpha>1$) are stored in the effective range memory 11 as an effective range dH, dS and dL expressed in HSL values. These values are derived from the following equations:

$$dH = |H_1X - Hu| X\alpha$$

$$dS = |S_1X - Su| X\alpha$$

$$dL = |L_1X - Lu| X\alpha$$

The absolute differences between the $H_1x$, $S_1x$ and $L_1x$ signals and Hu, Su and Lu are multiplied by $\alpha$ for the following reason.

If dH, dS and dL were regarded as absolute differences between the $H_1x$, $S_1x$ and $L_1x$ signals and Hu, Su $L_1B$ and Lu, the pixel designated as an example of pixels subjected to the sharpness processing would be on a boundary of the effective range. The sharpness processing for the boundary of the effective range would have no effect when the parameter k is amended to be K as described hereinafter, and applied to the respective pixels in the original image. Then, contrary to the operator's intention, the pixel designated as an example of pixels to be processed would not be processed. Absolute differences between the $H_1x$, $S_1x$ and $L_1x$ signals and Hu, Su and Lu are multiplied by $\alpha(\alpha>1)$ to enlarge values of the boundary of the effective range, thereby effecting sufficient sharpness processing for the pixel designated as an example to be processed. In this embodiment, "2" is set as $\alpha$ though the value of $\alpha$ may be varied as desired.

(2) Where one pixel is designated as an example of pixels for which sharpness processing is not desired, the $R_0x$, $G_0x$ and $B_0x$ signals and $H_0x$, $S_0x$ and $L_0x$ signals (where x=1) are stored in the effective range pixel value memory 7. Absolute differences between the $H_0x$, $S_0x$ and $L_0x$ signals and Hu, Su and Lu are stored in the effective range memory 11 as an effective range dH, dS and dL. These values are derived from the following equations:

$$dH = |H_0x - Hu|$$

$$dS = |S_0x - Su|$$

$$dL = |L_0x - Lu|$$

The vales of dH, dS and dL are derived without multiplying by $\alpha$ as distinct from the case (1) above. The reason for this is that the pixel designated as an example for which the sharpness processing is not desired will be on the boundary of the effective range, and it is preferable that the sharpness processing produces no effect on that pixel.

(3) Where one pixel is designated as an example of pixels for sharpness processing, and another pixel as an example of pixels for which the sharpness processing is not desired, the $R_1x$, $G_1x$ and $B_1x$ signals, $R_0x$, $G_0x$ and $B_0x$ signals, $H_1x$, $S_1x$ and $L_1x$ signals and $H_0x$, $S_0x$ and $L_0x$ signals (where x=1) are stored in the effective range pixel value memory 7. Averages of absolute differences between the $H_1x$, $S_1x$ and $L_1x$ signals and Hu, Su and Lu and absolute differences between the $H_0x$, $S_0x$ and $L_0x$ signals and Hu, Su and Lu are stored in the effective range memory 11 as an effective range dH, dS and dL. These averages are derived from the following equations:

$$dH = (|H_1x\text{-}Hu| + |H_0x\text{-}Hu|) \div 2$$

$$dS = (|S_1x\text{-}Su| + |S_0x\text{-}Su|) \div 2$$

$$Dl = (|L_1x\text{-}Lu| + |L_0x\text{-}Lu|) \div 2$$

When $|H_1x\text{-}Hu| > H_0x\text{-}Hu|$, the apparatus determines that this is a designation error made by the operator. Then, an error message with a type of error, for example, is displayed on the control monitor 9 or the like, prompting the operator to designate pixels again. This is a case where the pixel designated as an example for which the processing is not desired lies within the effective range designated for sharpness processing, which is contradictory for the purpose of processing. This apparatus takes account of the fact that the operator often refers to differences in hue when designating pixels. Hence, even when $|S_1x\text{-}Su| > |S_0x\text{-}Su|$ or $|L_1x\text{-}Lu| > |L_0x\text{-}Lu|$, the apparatus does not regard this as an error but computes the effective range dH, dS and dL. However, for the sake of strictness, designated values for saturation and lightness may also be checked as for hue.

(4) Where a plurality of pixels are designated as examples for sharpness processing, the $R_1x$, $G_1x$ and $B_1x$ signals and $H_1x$, $S_1x$ and $L_1x$ signals (where x is the number of pixels designated) are stored in the effective range pixel value memory 7. Maximum values are obtained from among absolute differences between the $H_1x$, $S_1x$ and $L_1x$ signals and Hu, Su and Lu. The maximum values ($|H_1x\text{-}Hu|_{MAX}$, $|S_1x\text{-}Su|_{MAX}$ and $|L_1x\text{-}Lu|_{MAX}$) multiplied by $\alpha(\alpha>1)$ are stored in the effective range memory 11 as an effective range dH, dS and dL. These values are derived from the following equations:

$$dH = |H_1x\text{-}Hu|_{MAX} \times \alpha$$

$$dS = |S_1x\text{-}Su|_{MAX} \times \alpha$$

$$dL = |L_1x\text{-}Lu|_{MAX} \times \alpha$$

(5) Where a plurality of pixels are designated as examples of pixels for which sharpness processing is not desired, the $R_0x$, $G_0x$ and $B_0x$ signals and $H_0x$, $S_0x$ and $L_0x$ signals (where x is the number of pixels designated) are stored in the effective range pixel value memory 7. Minimum values are obtained from among absolute differences between the $H_0x$, $S_0x$ and $L_0x$ signals and Hu, Su and Lu, and are stored in the effective range memory 11 as an effective range dH, dS and dL. These values are derived from the following equations:

$$dH - |H_0x\text{-}Hu|_{MIN}$$

$$dS = |S_0x\text{-}Su|_{MIN}$$

$$dL - |L_0x\text{-}Lu|_{MIN}$$

(6) Where a plurality of pixels are designated as examples for sharpness processing, and a plurality of pixels as examples of pixels for which the sharpness processing is not desired, the $R_1x$, $G_1x$ and $B_1x$ signals, $R_0x$, $G_0x$ and $B_0x$ signals, $H_1x$, $S_1x$ and $L_1x$ signals, and $H_0x$, $S_0x$ and $L_0x$ signals (where x is the number of pixels designated) are stored in the effective range pixel value memory 7.

Maximum values are obtained from among absolute differences between the $H_1x$, $S_1x$ and $L_1x$ signals and Hu, Su and Lu. Minimum values are obtained from among absolute differences between the $H_0x$, $S_0x$ and $L_0x$ signals and Hu, Su and Lu. Averages of the maximum values ($|H_1x\text{-}Hu|_{MAX}$, $|S_1x\text{-}su|_{MAX}$ and $|L_1x\text{-}Lu|_{MAX}$) and minimum values ($|H_0x\text{-}Hu|_{MIN}$, $|S_0x\text{-}Su|_{MIN}$ and $|L_0x\text{-}Lu|_{MIN}$) are stored in the effective range memory 11 as an effective range dH, dS and dL. These averages are derived from the following equations:

$$dH = (|H_1x\text{-}Hu|_{MAX} + |H_0x\text{-}Hu|_{MIN}) \div 2$$

$$dS = (|S_1x\text{-}Su|_{MAX} + |S_0x\text{-}Su|_{MIN}) \div 2$$

$$dL = (|L_1x\text{-}Lu|_{MAX} + |L_0x\text{-}Lu|_{MIN}) \div 2$$

When $|H_1x\text{-}Hu|_{MAX} > |H_0x\text{-}Hu|_{MIN}$, error processing is carried out as in the case (3) above.

Next, the RGB signals of pixels in the original image stored in the first frame memory 2 are successively read and temporarily stored in the second pixel value memory 14.

If the number of pixels in the horizontal direction of the first frame memory 2 is x and that in the vertical direction thereof is y, Rij, Gij and Bij signals of pixels ij ($i=1, 2, \ldots x, j=1, 2, \ldots y$) are successively stored in the second pixel value memory 14. Then, Rij, Gij and Bij signals in the m-bits after deleting the several lower bits, as in the case of the first pixel value memory 6, are outputted to the lookup table 12. The corresponding values Hij, Sij and Lij in n-bits are stored in a different storage region of the second pixel value memory 14.

The Rij, Gij and Bij signals are outputted also to a sharpness processor 15. These are the original n-bit signals retaining the lower several bits.

A comparator 16 compares Hu, Su and Lu stored in the first pixel value memory 6 and Hij, Sij and Lij successively stored in the second pixel value memory 14, to determine whether the absolute differences therebetween are larger than the values of dH, dS and dL stored in the effective range memory 11. The comparisons are based on the following expressions:

$$|Hij\text{-}Hu| < dH$$

$$|Sij\text{-}Su| < dS$$

$$|Lij\text{-}Lu| < dL$$

When all of the values of Hij, Sij and Lij satisfy the above comparison expressions (i.e. when the values in HSL color space of pixels ij read from the first frame memory 2 are in the effective range), the comparator 16 outputs a control signal to the sharpness processor 15 to execute sharpness processing.

Conversely, when even one of Hij, Sij and Lij does not satisfy the above comparison expression (i.e. outside the effective range), the sharpness processor 15 receives a control signal not to execute sharpness processing.

In response to the control signal to execute the processing, the sharpness processor 15 reads the data of Hu, Su and Lu stored in the first pixel value memory 6, the data of Hij, Sij and Lij stored in the second pixel value memory 14, the data of dH, dS and dL stored in the effective range memory 11, and the data of k stored in the parameter memory 13. Further, the sharpness processor 15 carries out sharpness processing, as described hereinafter, of the Rij, Gij and Bij signals outputted from the second pixel value memory 14, and stores results in a second frame memory 17.

Upon receipt of the control signal not to execute the processing from the comparator 16, the sharpness processor 15 stores the Rij, Gij and Bij signals outputted from the second pixel value memory 14 in the second frame memory 17 without processing the signals.

The sharpness processing, basically, is carried out by applying the value of k stored in the parameter memory 13 to the following equations:

$$rij = Rij + k (Rij - U_R) \quad (1)$$

$$gij = Gij + k (Gij - U_G) \quad (2)$$

$$bij = Bij + k (Bij - U_B) \quad (3)$$

In the above equations, $U_R$, $U_G$ and $U_B$ are unsharp signals obtained, for example, by averaging color component signals R, G and B of each of 5×5 pixels around key pixel "ij", respectively, and rij, gij and bij are RGB signals of key pixel "ij" after the processing. However, the following problem could arise from the above.

If execution or non-execution of the sharpness processing is determined, with reference to the designated effective range, for a group of pixels in a portion of the original image where the RGB signals have smoothly varying values, the sharpness may be enhanced or suppressed abruptly across the group of smoothly varying pixels, resulting in an unnatural image. This is a phenomenon known as a tone jump.

To eliminate this problem, the following processing is carried out prior to the sharpness processing.

First, absolute values ΔH,ΔS and ΔL of the differences between the Hij, Sij and Lij data of Rij, Gij and Bij signals of pixels ij to be processed and the Hu, Su and Lu data of Ru, Gu and Bu signals of the color to be processed are derived from the following equations:

$$|Hij - Hu| = \Delta H$$

$$|Sij - Su| = \Delta S$$

$$|Lij - Lu| = \Delta L$$

Coefficients for varying the parameter k according to these differences are derived as follows:

$$1 - (\Delta H/dH) = kh$$

$$1 - (\Delta S/dS) = ks$$

$$1 - (\Delta L/dL) = kl$$

In the above equations, dH, dS and dL are values showing the effective range of sharpness processing stored in the effective range memory 11, i.e. values showing a boundary between the pixels to be processed and other pixels.

Letters kh, ks and kl denote coefficients which approach a minimum "0" as ΔH, ΔS and ΔL approach dH, dS and dL, and approach a maximum "1" as ΔH, ΔS and ΔL approach "0", i.e. move away from dH, dS and dL.

Thus, when the coefficients kh, ks and kl are applied to the sharpness processing parameter k in the equation set out below, a new parameter is obtained which makes k the smaller as it approaches the boundary values (i.e. moves away from the color to be processed) and which approaches the value of k as it moves away from the boundary values (toward the color to be processed). This parameter is named K.

$$K = k \cdot kh \cdot ks \cdot kl$$

By substituting parameter K for parameter k in the foregoing equations (1)-(3) to effect sharpness processing, a natural sharpness processing is effected without the tone of the image changing abruptly across the group of smoothly varying pixels. The letters and signs kh·ks·kl to the right side of the above parameter K may be replaced with the square root of kh·ks·kl.

These rij, gij and bij after the sharpness processing are stored in the second frame memory 17.

The image signals resulting from the sharpness processing and stored in the second frame memory 17 and the image (original image) signals before the processing stored in the first frame memory 2 are selectively outputted to and displayed on the image monitor 3 by an internal switch SW of the data input device 4 operable by a switch or the like of the mouse 5. This is convenient in practice since the images before and after the processing can be alternately observed for comparison. The images before and after the processing may be displayed side by side in a split screen mode on the image monitor 3.

The processed image corresponding to one frame and stored in the second frame memory 17 are outputted to an output scanner 31 after being converted from the RGB signals into signals of cyan (C), magenta (M), yellow (Y) and black (B), and recorded on the film. While the output scanner 31 is connected to the apparatus so that the RGB signals of the processed image are outputted to the output scanner 31, the RGB signals of the processed image may be outputted, for example, to the magneto-optical disk driver 1 for storage on a magneto-optical disk to be transferred to a separate plate-making system or the like. The medium for transferring the RGB signals of the processed image to the separate plate-making system or the like is not limited to the magneto-optical disk but may be magnetic tape or the like.

According to this embodiment, the sharpness processing is carried out only for the pixels within a designated effective range, which may be all pixels in an original image. That is, all pixels within a designated color range in one original image are subjected to the sharpness processing. If this is inconvenient, the above processing may be effected only for a region designated with the mouse 5 or the like of the data input device 4.

The present invention may be embodied in other specific forms without departing from the spirit or essential attributes thereof and, accordingly, reference should be made to the appended claims, rather than to the foregoing specification, as indicating the scope of the invention.

What is claimed is:

1. A sharpness processing apparatus including a processor for obtaining input image signals of an original image from an input device, effecting sharpness processing and outputting the image signals of the original image after the sharpness processing to an output device, said apparatus comprising:

a first frame memory for receiving and storing digitized RGB signals representing R (red), G (green) and B (blue) components of pixels of said original image;

an image monitor for receiving the RGB signals of said original image stored in said first frame memory to display said original image;

a pointing device connected to said processor for moving a point designating marker displayed on said image monitor along with said original image, and applying coordinates of a point designated by said marker on a screen of said image monitor to said first frame memory as an address of a pixel corresponding to said point from which to read the RGB signals, said pointing device being used at least to designate a reference color acting as a central object for sharpness processing and to designate an effective range of the sharpness processing based on said reference color when identifying, by means of a color, a region to be subjected to the sharpness processing in said original image displayed on said image monitor;

a parameter designating device for designating a parameter to indicate a degree of the sharpness processing;

a parameter memory for storing said parameter designated;

an image data conversion memory for storing combinations of three HSL values comprising hue (H), saturation (S) and lightness (L), representing perceived colors corresponding to said RGB signals, in storage regions at addresses representing various combinations of said RGB signals;

a first pixel value memory for storing HSL values of a designated pixel relating to said reference color read from said image data conversion memory by applying thereto, as reading addresses, the RGB signals of the designated pixel relating to said reference color read from said first frame memory;

an effective range pixel value memory for storing HSL values of a designated pixel relating to an effective range of the sharpness processing read from said image data conversion memory by applying thereto, as reading addresses, the RGB signals of the designated pixel relating to said effective range of the sharpness processing read from said first frame memory;

effective range determining means for determining an effective range, expressed as HSL values dH, dS and dL, of the sharpness processing based on said reference color, from the HSL values of the designated pixel relating to said reference color and stored in said first pixel value memory and the HSL values of the designated pixel relating to said effective range of the sharpness processing and stored in said effective range pixel value memory;

an effective range memory for storing said effective range (dH, dS and dL) of the sharpness processing determined by said effective range determining means;

a second pixel value memory for successively reading from said first frame memory and storing the RGB signals of the pixels in said original image, and for storing the HSL values read from said image data conversion memory by applying the RGB signals thereto as reading addresses;

comparator means for deriving absolute differences between the HSL values of said reference color stored in said first pixel value memory and the HSL values of the pixels in said original image stored in said second pixel value memory, to determine whether the absolute differences therebetween are smaller than said effective range (dH, dS and dL) of the sharpness processing stored in said effective range memory, and outputting an instruction to execute the sharpness processing when said absolute differences are smaller than said effective range, and an instruction to withhold the sharpness processing when said absolute differences are larger than said effective range;

sharpness processing means for effecting the sharpness processing, only when said comparator means outputs the instruction to execute the sharpness processing, by applying the parameter stored in said parameter memory to the RGB signals of said original image stored in said second pixel value memory; and a second frame memory for storing, in positions corresponding to the pixels in said original image, the RGB signals of the pixels in said original image stored in said second pixel value memory in response to the instruction of said comparator means to withhold the sharpness processing, and for storing, in the positions corresponding to the pixels in said original image, RGB signals of the pixels in said original image resulting from the sharpness processing by said sharpness processing means in response to the instruction of said comparator means outputs to execute the sharpness processing, said second frame memory being operable to output the RGB signals resulting from the sharpness processing to said image monitor.

2. An apparatus ad defined in claim 1, wherein said image monitor is operable to display said reference color in superposition in a predetermined region on the screen showing the original image.

3. An apparatus ad defined in claim 1, wherein said image monitor is operable to highlight all of the pixels in said original image having values corresponding to said reference color.

4. Art apparatus as defined in claim 1, wherein said first pixel value memory is operable to read the RGB signals of the pixel designated as said reference color by said pointing device and RGB signals of adjacent pixels from said first frame memory, and to store, as the HSL values of the designated pixel relating to said reference color, HSL values read from said image data conversion memory by applying thereto averages of said RGB signals as reading addresses.

5. An apparatus as defined in claim 1, further comprising a keyboard for designating said reference color with numeric values of RGB signals of said reference color, said first pixel value memory storing, as the HSL values of the designated pixel relating to said reference color, HSL values read from said image data conversion memory by applying thereto as reading addresses the RGB signals of said reference color designated by said keyboard.

6. An apparatus as defined in claim 1, further comprising a keyboard for designating, with HSL values, said effective range (dH, dS and dL) of the sharpness processing based on said reference color, said effective range (dH, dS and dL) of the sharpness processing designated by said keyboard being stored in said effective range memory.

7. An apparatus as defined in claim 1, further comprising a default value memory for storing, as default values, HSL values predetermined to be said effective range (dH, dS and dL) of the sharpness processing based on said reference color, said effective range (dH, dS and dL) of the sharpness processing stored in said default value memory being applied to said effective range memory.

8. An apparatus as defined in claim 1, further comprising parameter amending means for computing absolute differences between the HSL values of said reference color stored in said first pixel value memory and the HSL values of pixels stored in said second pixel value memory when said comparator means outputs the instruction to execute the sharpness processing, and amending said parameter for the sharpness processing such that the larger the differences are, the smaller the parameter is made; said sharpness processing means being operable to effect the sharpness processing, only when said comparator means outputs the instruction to execute the sharpness processing, by applying the amended parameter to the RGB signals of said original image stored in said second pixel value memory.

9. An apparatus as defined in claim 1, wherein said pointing device is operable to designate said effective range of the sharpness processing with at least one example of pixels designated for undergoing the sharpness processing.

10. An apparatus as defined in claim 1, wherein said pointing device is operable to designate said effective range of the sharpness processing with at least one example of pixels designated for exclusion from the sharpness processing.

11. An apparatus as defined in claim 1, wherein said pointing device is operable to designate said effective range of the sharpness processing with at least one example of pixels designated for undergoing the sharpness processing, and at least one example of pixels designated for exclusion from the sharpness processing.

12. An apparatus as defined in claim 9, wherein said effective range determining means is operable to compute absolute differences between the HSL values of said reference color stored in said first pixel value memory and the HSL values of pixels stored in said effective range pixel value memory and designated as examples of pixels to be subjected to the sharpness processing, to select maximum absolute differences from among the pixels designated as examples of pixels to be subjected to the sharpness processing, to multiply the selected maximum absolute differences by a predetermined coefficient, and to determine the effective range (dH, dS and dL) of the sharpness processing based on said reference color from products of the selected maximum absolute differences and the coefficient.

13. An apparatus as defined in claim 10, wherein said effective range determining means is operable to compute absolute differences between the HSL values of said reference color stored in said first pixel value memory and the HSL values of pixels stored in said effective range pixel value memory and designated as examples of pixels to be excluded from the sharpness processing, to select minimum absolute differences from among the pixels designated as examples of pixels to be excluded from the sharpness processing, to multiply the selected minimum absolute differences by a predetermined coefficient, and to determine the effective range (dH, dS and dL) of the sharpness processing based on said reference color from products of the selected minimum absolute differences and the coefficient.

14. An apparatus as defined in claim 11, wherein said effective range determining means is operable to compute absolute differences between the RSL values of said reference color stored in said first pixel value memory and the HSL values of pixels stored in said effective range pixel value memory and designated as examples of pixels to be subjected to the sharpness processing, to select maximum absolute differences from among the pixels designated as examples of pixels to be subjected to the sharpness processing, to compute absolute differences between the HSL values of said reference color stored in said first pixel value memory and the HSL values of pixels stored in said effective range pixel value memory and designated as examples of pixels to be excluded from the sharpness processing, to select minimum absolute differences from among the pixels designated as examples of pixels to be excluded from the sharpness processing, and to determine the effective range (dH, dS and dL) of the sharpness processing based on said reference color from averages of the selected maximum absolute differences and the selected minimum absolute differences.

15. An apparatus as defined in claim 18, wherein said parameter amending means is operable to amend the parameter by computing absolute differences between the HSL values of said reference color stored in said first pixel value memory and the HSL values of pixels stored in said second pixel value memory when said comparator means outputs the instruction to execute the sharpness processing, deriving coefficients kh, ks and kl for decreasing the parameter k with increases of the absolute differences $\Delta H$, $\Delta S$ and $\Delta L$ from the following equations using the effective range dH, dS and dL of the sharpness processing stored in said effective range memory:

$$kh = 1 - (\Delta H/dH)$$

$$ks = 1 - (\Delta S/dS)$$

$$kl = 1 - (\Delta L/dL)$$

and applying the coefficients kh, ks and kl derived to the parameter k.

16. An apparatus as defined in claim 5, wherein said parameter amending means is operable to amend the parameter by multiplying the parameter k by a product kh·ks·kl of the coefficients kh, ks and kl.

17. An apparatus as defined in claim 5, wherein said parameter amending means is operable to amend the parameter by multiplying the parameter k by the square root of a product kh·ks·kl of the coefficients kh, ks and kl.

* * * * *